United States Patent
Warren et al.

(10) Patent No.: US 10,794,795 B2
(45) Date of Patent: Oct. 6, 2020

(54) LOW PROFILE EMBEDDED NON-INTRUSIVE STRESS MEASUREMENT SYSTEM PROBE

(71) Applicant: UNITED TECHNOLOGIES CORPORATION, Farmington, CT (US)

(72) Inventors: Eli Cole Warren, Wethersfield, CT (US); Michael F. Sabol, Port St. Lucie, FL (US); Alan E. Ingram, Palm City, FL (US); Michael J. Saitta, East Hampton, CT (US); Darren M. Wind, Glastonbury, CT (US); Steven D Mitchell, Port St. Lucie, FL (US); Sebastian Martinez, Ivoryton, CT (US); Kevin Andrew Ford, Killingworth, CT (US); Patrick M. Harrington, West Hartford, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 209 days.

(21) Appl. No.: 16/132,128

(22) Filed: Sep. 14, 2018

(65) Prior Publication Data
US 2020/0088606 A1   Mar. 19, 2020

(51) Int. Cl.
*G01M 15/14* (2006.01)
*F01D 25/24* (2006.01)
*F02C 3/04* (2006.01)
*F02C 7/00* (2006.01)
*F02K 3/06* (2006.01)

(52) U.S. Cl.
CPC .............. *G01M 15/14* (2013.01); *F01D 25/24* (2013.01); *F02C 3/04* (2013.01); *F02C 7/00* (2013.01); *F02K 3/06* (2013.01); *F05D 2260/80* (2013.01)

(58) Field of Classification Search
CPC ...................................................... G01M 15/14
USPC ...................................................... 73/112.01
See application file for complete search history.

(56) References Cited

U.S. PATENT DOCUMENTS

| | | | | |
|---|---|---|---|---|
| 4,657,386 A | * | 4/1987 | Suarez-Gonzalez | G01J 5/60 356/43 |
| 4,666,297 A | * | 5/1987 | Suarez-Gonzalez | F01D 17/085 356/43 |
| 4,696,544 A | * | 9/1987 | Costella | G02B 23/26 356/241.1 |
| 4,708,474 A | * | 11/1987 | Suarez-Gonzalez | G01J 5/60 356/43 |

(Continued)

FOREIGN PATENT DOCUMENTS

| | | |
|---|---|---|
| EP | 2341324 | 7/2011 |
| EP | 3327405 | 5/2018 |
| WO | 2007115314 | 10/2007 |

OTHER PUBLICATIONS

European Patent Office, European Search Report dated Jan. 22, 2020 in Application No. 19186112.9.

*Primary Examiner* — Eric S. McCall
(74) *Attorney, Agent, or Firm* — Snell & Wilmer L.L.P.

(57) ABSTRACT

A low profile un-lensed non-intrusive stress measurement system probe may comprise a housing comprising a first channel and an optical face, a first hypotube disposed within the first channel and coupled at a sensing aperture in the optical face, and a plurality of optical fibers disposed within the first hypotube, wherein the first hypotube executes a bend between 45° and 90° within the housing.

20 Claims, 9 Drawing Sheets

(56) References Cited

U.S. PATENT DOCUMENTS

| | | |
|---|---|---|
| 9,297,720 B2 | 3/2016 | Agoos et al. |
| 9,518,894 B2 | 12/2016 | Leroux et al. |
| 10,024,761 B2 | 7/2018 | Cornes et al. |
| 2012/0069355 A1 | 3/2012 | Hynous |
| 2014/0064924 A1* | 3/2014 | Warren .................... G01B 7/14 |
| | | 415/118 |
| 2014/0083215 A1* | 3/2014 | Warren ................... F01D 17/02 |
| | | 73/866.5 |
| 2014/0270625 A1* | 9/2014 | Warren ................... F01D 17/02 |
| | | 385/12 |
| 2016/0194976 A1 | 7/2016 | Smith |
| 2016/0273974 A1* | 9/2016 | Hockaday ................ G01K 1/14 |
| 2019/0169355 A1* | 6/2019 | Warren ................. C08G 59/64 |
| 2019/0170011 A1* | 6/2019 | Warren ................. F04D 29/526 |
| 2020/0096331 A1* | 3/2020 | Warren ................. G01B 21/16 |

* cited by examiner

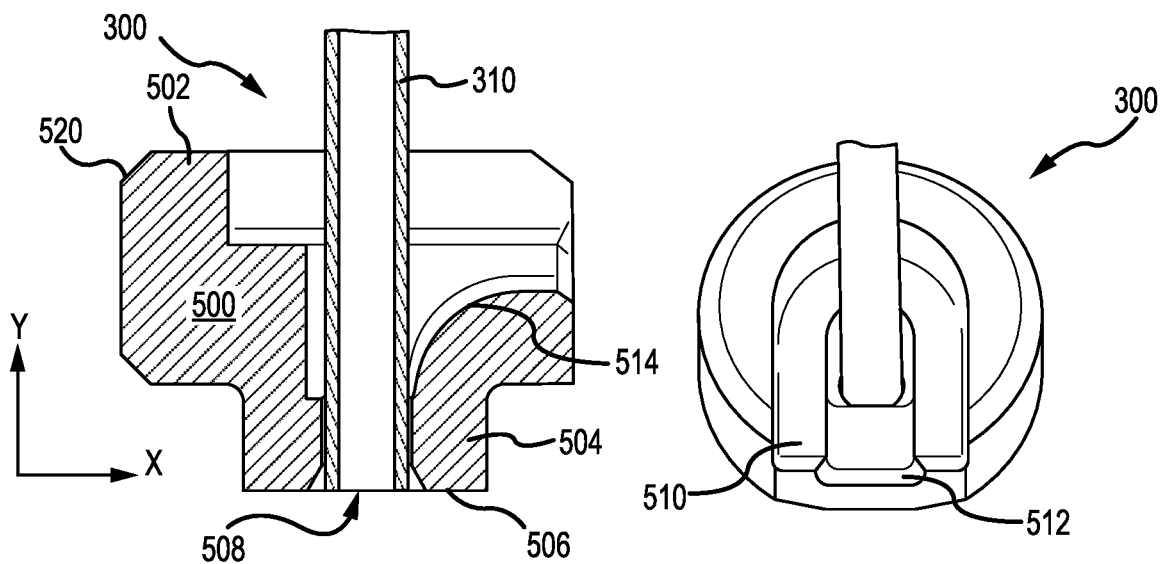
FIG.5A
FIG.5B
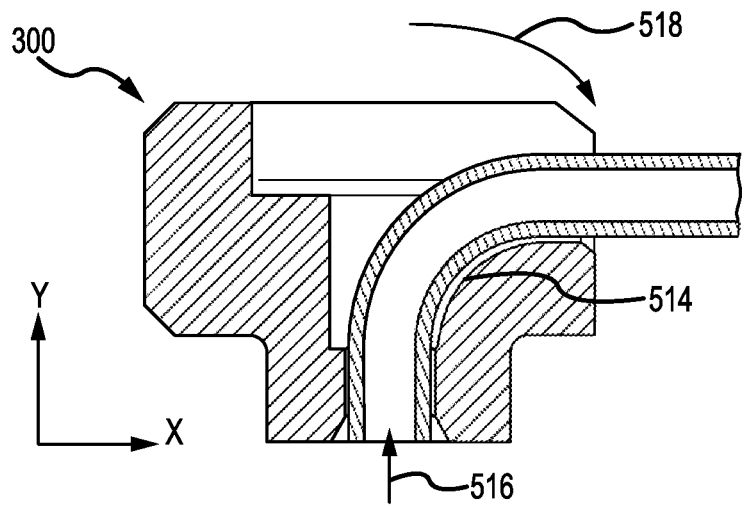
FIG.5C
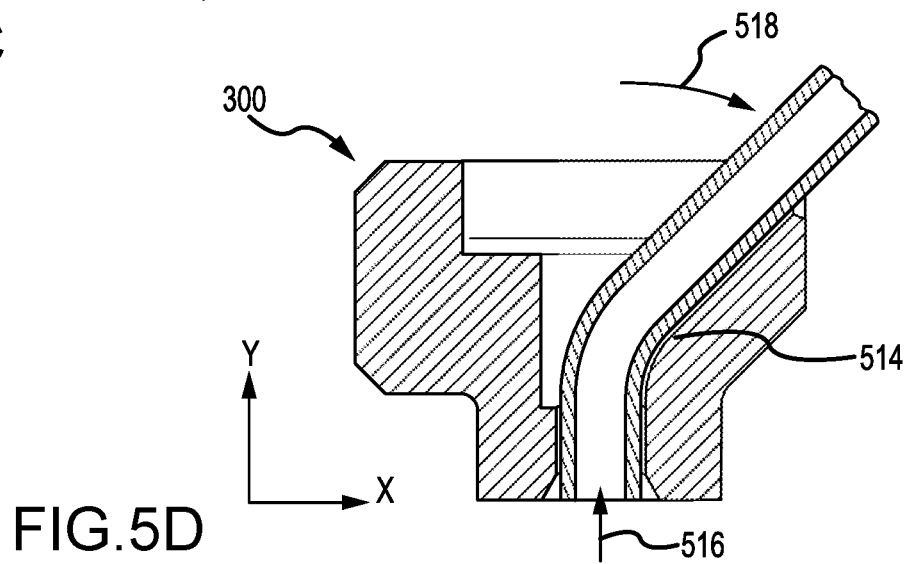
FIG.5D

LOW PROFILE EMBEDDED NON-INTRUSIVE STRESS MEASUREMENT SYSTEM PROBE

GOVERNMENT LICENSE RIGHTS

This invention was made with Government support awarded by the United States. The Government has certain rights in this invention.

FIELD

The present disclosure relates to Non-intrusive Stress Measurement System (NSMS) probes, and more particularly, to low profile multi-fiber NSMS probes for turbomachinery and gas turbine engines.

BACKGROUND

A gas turbine engine typically includes a fan section, a compressor section, a combustor section and a turbine section. The fan section and compressor section together are typically referred to as the cold section. The combustor section and turbine section together are typically referred to as the hot section. Bladed disk turbomachinery of the cold section and the turbine section rotate at great speed which places the blades under severe stress. For operational analysis and safety it is desirable to monitor these stresses. Non-Intrusive Stress Measurement System (NSMS) are systems which monitor these stresses without relying on sensors integral to or intruding on the rotating turbomachinery. NSMS sensors (i.e. probes) mounted within the geometry of structures (such as, for example, a case) external to the blade disk are used to measure each blade's behavior including vibratory response characteristics such as stress, phase, frequency, resonance, and damping.

Many cases in turbine engines tend to have restrictive structural geometries for NSMS probe mounting. For example, geometries may be thin and/or may be placed between gas paths. Current probe designs tend to be relatively thick and thereby extend beyond the structural geometry and into the gas path tending thereby to block or obstruct the gas path. In this regard, turbine engine performance may be degraded or compromised.

SUMMARY

In various embodiments the present disclosure provides a low profile un-lensed non-intrusive stress measurement system probe may comprise a housing comprising a first channel and an optical face, a first hypotube disposed within the first channel and coupled at a sensing aperture in the optical face, and a plurality of optical fibers disposed within the first hypotube, wherein the first hypotube executes a bend between 45° and 90° within the housing.

In various embodiments, the plurality of optical fibers comprises at least one of a transmit fiber and a receive fiber. In various embodiments, the housing comprises a second channel within the first channel, wherein the second channel comprises a radiused portion. In various embodiments, the first hypotube is bent along the radiused portion. In various embodiments, the plurality of optical fibers are arranged in an expendable fiber arrangement holder, wherein the expendable fiber arrangement holder is coupled at the sensing aperture. In various embodiments, the first hypotube is filled with an epoxy. In various embodiments, the epoxy is cured and the expendable fiber arrangement holder is polished flush with the optical face in response to bending the first hypotube along the radiused portion. In various embodiments, a cap is coupled to the housing, wherein the cap comprises a hood covering the first channel and a sleeve portion about the first hypotube, wherein a second hypotube is disposed about the first hypotube and inserted into the sleeve portion. In various embodiments, the housing is disposed within a cavity defined by an annular wall about a first annulus of a first annular disk, wherein the housing comprises barrel inserted into the first annulus of the first annular disk, wherein a second annular disk comprising a second annulus defined by the outer diameter of the annular wall is coupled at the second annulus to the annular wall.

In various embodiments, the present disclosure provides a gas turbine engine comprising a fan section, a compressor section aft of the fan section and configured to compress a gas, a combustor section aft of the compressor section and configured to combust the gas, a turbine section aft of the combustor section and configured to extract work from the gas, a case about at least one of the fan section, the compressor section, the combustor section, or the turbine section and a low profile un-lensed non-intrusive stress measurement system probe coupled to the case, comprising a first channel and an optical face, a first hypotube disposed within the first channel and coupled at a sensing aperture in the optical face, and a plurality of optical fibers disposed within the first hypotube, wherein the first hypotube executes a bend between 45° and 90° within the housing.

In various embodiments, the plurality of optical fibers comprises at least one of a transmit fiber and a receive fiber. In various embodiments, the housing comprises a second channel within the first channel, wherein the second channel comprises a radiused portion. In various embodiments, the first hypotube is bent along the radiused portion. In various embodiments, the plurality of optical fibers are arranged in an expendable fiber arrangement holder, wherein the expendable fiber arrangement holder is coupled at the sensing aperture. In various embodiments, the first hypotube is filled with an epoxy. In various embodiments, the epoxy is cured and the expendable fiber arrangement holder is polished flush with the optical face in response to bending the first hypotube along the radiused portion. In various embodiments, a cap is coupled to the housing, wherein the cap comprises a hood covering the first channel and a sleeve portion about the first hypotube, wherein a second hypotube is disposed about the first hypotube and inserted into the sleeve portion. In various embodiments, the housing is disposed within a cavity defined by an annular wall about a first annulus of a first annular disk, wherein the housing comprises barrel inserted into the first annulus of the first annular disk, wherein a second annular disk comprising a second annulus defined by the outer diameter of the annular wall is coupled at the second annulus to the annular wall. In various embodiments, the case comprises a first bore having a lip forming an annular structure within the first bore, wherein the first annular disk has a first surface in contact with the lip and the second annular disk has a second surface in contract with the lip.

In various embodiments, the present disclosure provides a method of manufacturing a low profile un-lensed non-intrusive stress measurement system probe comprising inserting a plurality of optical fibers through a fiber channel of an expendable fiber arrangement holder and applying an epoxy to the plurality of optical fibers, drawing the plurality of optical fibers into a first hypotube coupled at a sensing aperture of a housing and filling the first hypotube with the epoxy, coupling a counterbore end of the expendable fiber arrangement holder to the first hypotube at the sensing aperture, bending the first hypotube within the housing to match a radiused portion of the housing, and polishing the expendable fiber arrangement holder flush with an optical face of the housing.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

FIG. 5A illustrates a cross section of a housing for a low profile un-lensed NSMS probe, in accordance with various embodiments;

FIG. 5B illustrates a perspective view of a housing for a low profile un-lensed NSMS probe, in accordance with various embodiments;

FIG. 5C illustrates a cross section of a housing for a low profile un-lensed NSMS probe, in accordance with various embodiments;

FIG. 5D illustrates a cross section of a housing for a low profile un-lensed NSMS probe, in accordance with various embodiments;

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
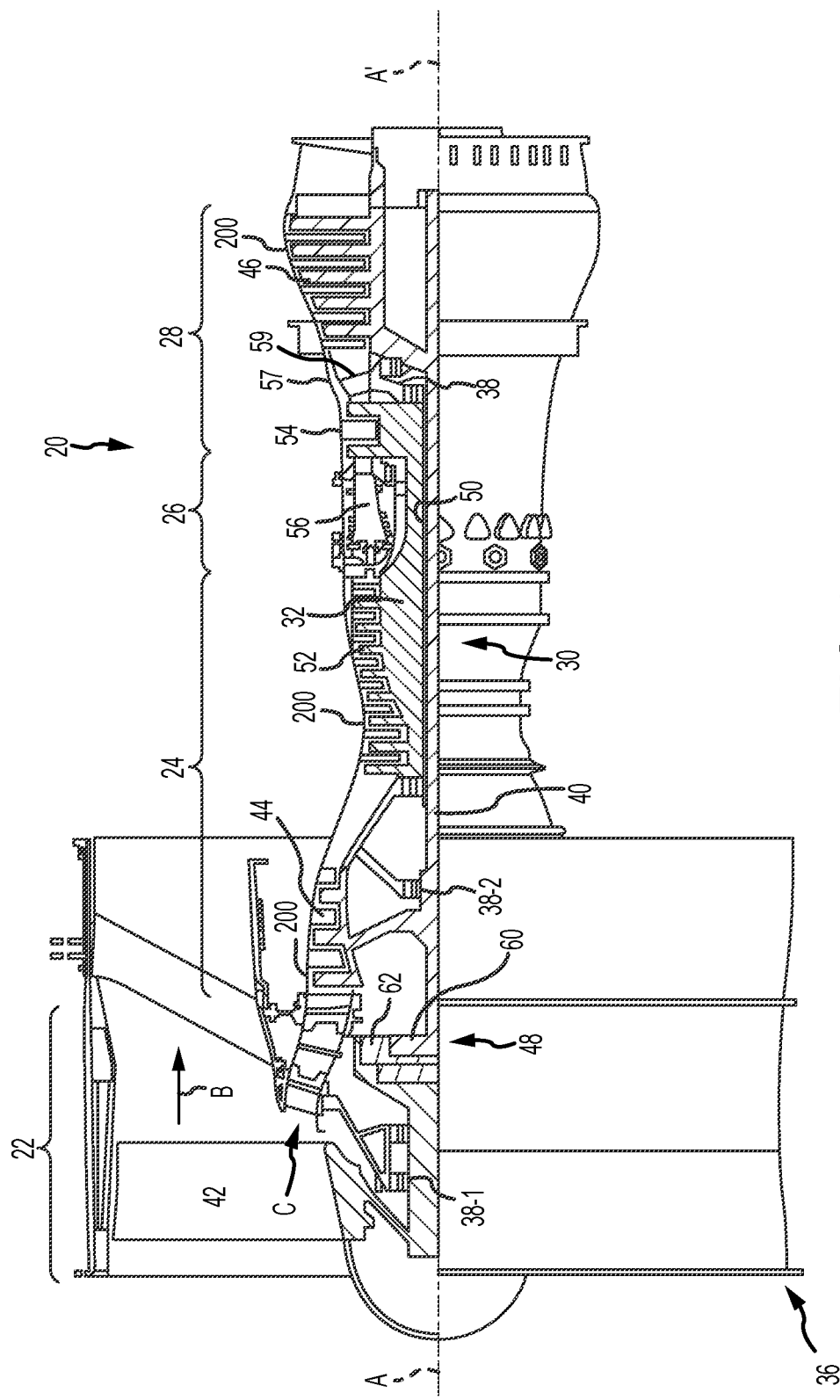
FIG. 1 illustrates an exemplary gas turbine engine, in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. In operation, fan section 22 can drive air along a bypass flow-path B while compressor section 24 can drive air for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including turbojet engines, a low-bypass turbofans, a high bypass turbofans, or any other gas turbine known to those skilled in the art.

Gas turbine engine 20 may generally comprise a low speed spool 30 and a high speed spool 32 mounted for rotation about an engine central longitudinal axis A-A' relative to an engine static structure 36 via one or more bearing systems 38 (shown as bearing system 38-1 and bearing system 38-2). It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure (or first) compressor section 44 (also referred to a low pressure compressor) and a low pressure (or first) turbine section 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor ("HPC") 52 (e.g., a second compressor section) and high pressure (or second) turbine section 54. A combustor 56 may be located between HPC 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then HPC 52, mixed and burned with fuel in combustor 56, then expanded over high pressure turbine 54 and low pressure turbine 46. Mid-turbine frame 57 includes airfoils 59 which are in the core airflow path. Low pressure turbine 46, and high pressure turbine 54 rotationally drive the respective low speed spool 30 and high speed spool 32 in response to the expansion.

Gas turbine engine 20 may be, for example, a high-bypass geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about 5. In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans.

In various embodiments, the next generation of turbofan engines may be designed for higher efficiency which is associated with higher pressure ratios and higher temperatures in the HPC 52. These higher operating temperatures and pressure ratios may create operating environments that may cause thermal loads that are higher than the thermal loads encountered in conventional turbofan engines, which may shorten the operational life of current components.

In various embodiments, HPC 52 may comprise alternating rows of rotating rotors and stationary stators. Stators may have a cantilevered configuration or a shrouded configuration. More specifically, a stator may comprise a stator vane, a casing support and a hub support. In this regard, a stator vane may be supported along an outer diameter by a casing support and along an inner diameter by a hub support. In contrast, a cantilevered stator may comprise a stator vane that is only retained and/or supported at the casing (e.g., along an outer diameter).

In various embodiments, rotors may be configured to compress and spin a fluid flow. Stators may be configured to receive and straighten the fluid flow. In operation, the fluid flow discharged from the trailing edge of stators may be straightened (e.g., the flow may be directed in a substantially parallel path to the centerline of the engine and/or HPC) to increase and/or improve the efficiency of the engine and, more specifically, to achieve maximum and/or near maximum compression and efficiency when the straightened air is compressed and spun by rotor 64. In various embodiments, one or more low profile un-lensed NSMS probes 200 may be located within the geometries of gas turbine engine 20 structures such as, for example, a fan case of fan section 22, a compressor case of compressor section 24, a combustor case of combustor section 26 and or the like. In various embodiments, a plurality of low profile un-lensed NSMS probes 200 may be located axially or circumferentially about a case.

Figure 2:
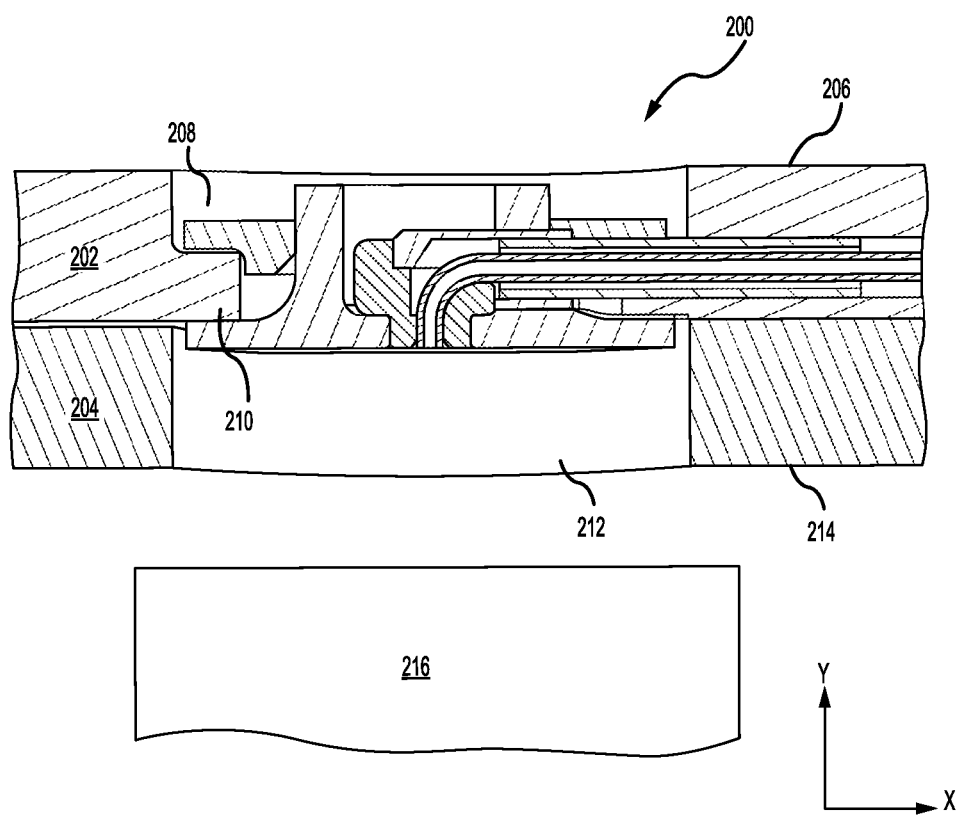
FIG. 2 illustrates a low profile un-lensed NSMS probe, in accordance with various embodiments.

With reference to FIG. 2, a low profile un-lensed NSMS probe 200 (hereinafter probe 200) is shown mounted to a case 202. Case 202 may comprise an outer gas path surface 206 and surround a rotating component of turbomachinery such as blade 216. A rub strip 204 comprising an inner gas path surface 214 may be coupled radially inward (relative to the axis of rotation of blade 216) of case 202 between the case 202 and the blade 216. Probe 200 is coupled at lip 210 of case 202 which extends inward (along the X-axis) within a first bore 208 through outer gas path surface 206 of case 202 thereby forming an annular structure within the first bore 208. In various embodiments, a corresponding second bore 212 through inner gas path surface 214 of rub strip 204 may tend to facilitate coupling of probe 200 to case 202.

Figure 3:
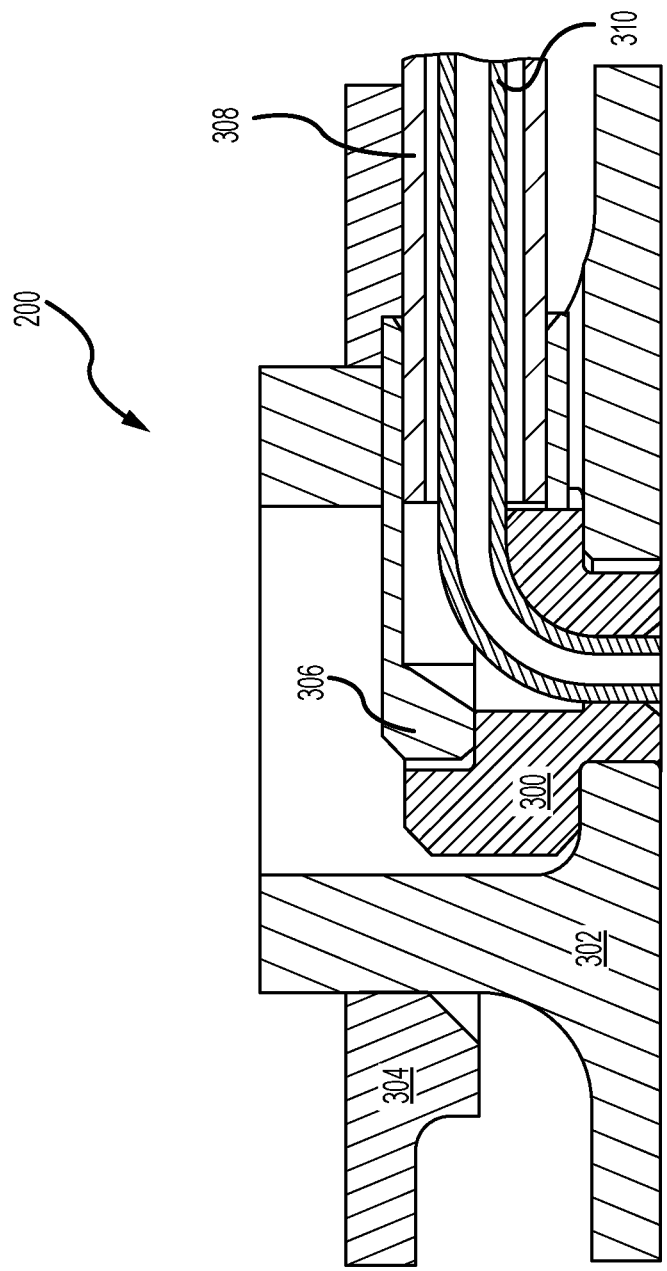
FIG. 3 illustrates a cross section of a low profile un-lensed NSMS probe, in accordance with various embodiments.
Figure 3:
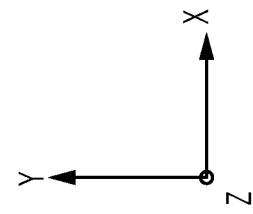

With additional reference to FIG. 3, probe 200 is shown in cross section through the X-Y plane. Probe 200 comprises housing 300 which retains an inner hypotube configured to contain a plurality of optical fibers. Housing 300 is disposed within a cavity formed by an annular wall of inner collar 302. Housing 300 is sealed by a cap 306 coupled to an outer hypotube 308 which shields the inner hypotube 310. An outer collar 304 is coupled about the annular wall of the inner collar 302.

Figure 4:
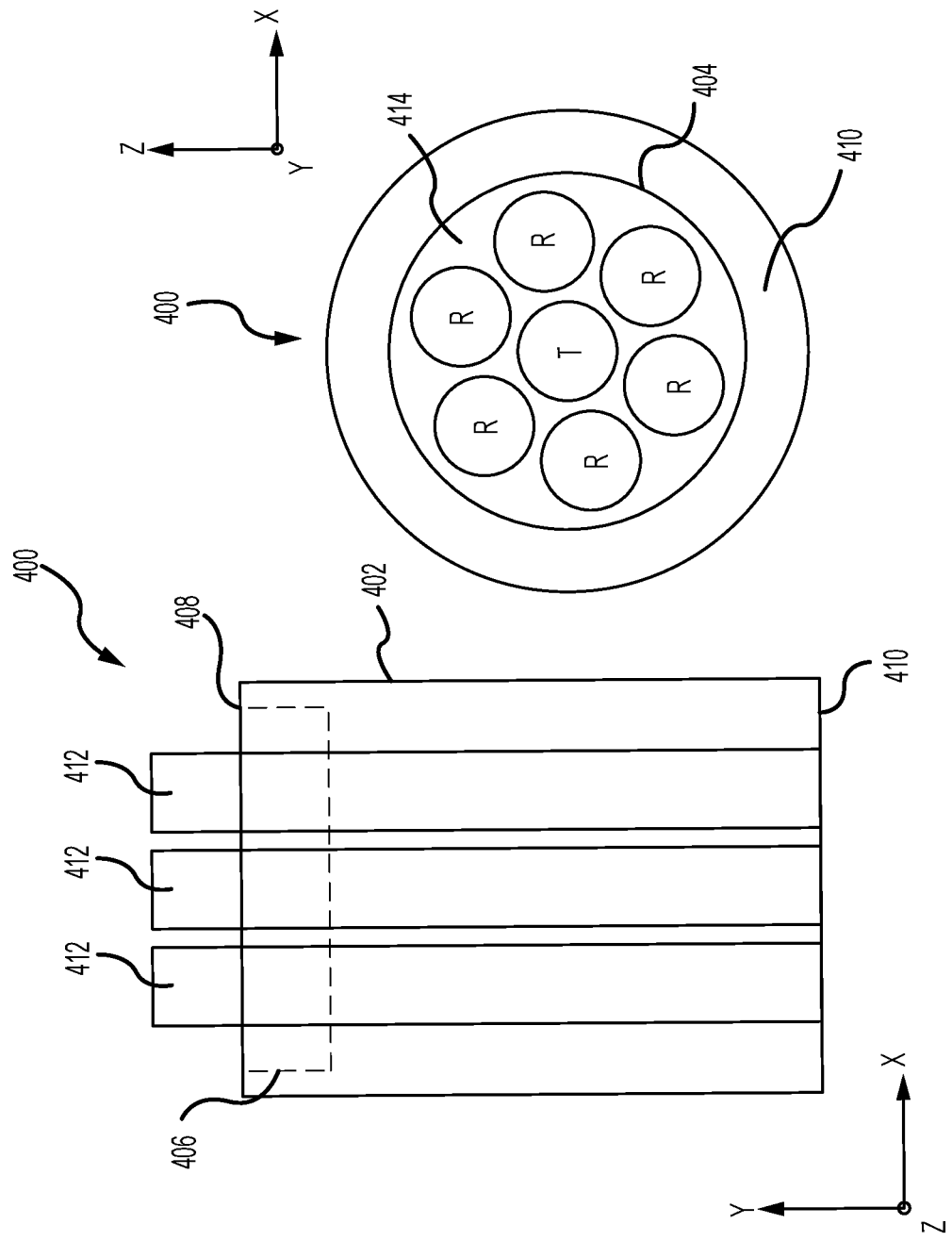
FIG. 4 illustrates an expendable fiber arrangement holder for a low profile un-lensed NSMS probe, in accordance with various embodiments.

With additional reference to FIG. 4 assembly of a probe 200 may include preparing an expendable fiber arrangement holder 400. In various embodiments, expendable fiber arrangement holder 400 may comprise a metal or a metal alloy such as, for example brass, bronze, and/or the like. Expendable fiber arrangement holder 400 comprises an annular cylindrical structure 402 having a fiber channel 404 and a counterbore portion 406 extending into counterbore end 408 opposite open end 410. A plurality of optical fibers 412 are inserted through open end 410 into fiber channel 404. An interference between the plurality of optical fibers and the wall of fiber channel 404 may tend to pack the plurality of optical fibers in a desirable geometic configuration. For example, seven fibers may be inserted into fiber channel 404 and may be arranged in a hexagonal packing configuration in response to the interference. In various embodiments, a hexagonal packing configuration may include a central transmit fiber T surrounded by six receive fibers R. In various embodiments, an epoxy 414 may be applied along the plurality of optical fibers 412 tending thereby to secure the plurality of optical fibers 412 in the desirable geometric configuration. In various embodiments, heat may be applied to promote the flow of epoxy 414 into the fiber channel 404.

In various embodiments, excess optical fibers extending at open end 410 may be cleaved and open end 410 may be polished. In various embodiments, the fiber channel 404 may have a diameter of 0.0167 in [0.4241 mm] and the counterbore portion 406 may have an internal diameter of 0.036 in [0.914 mm]. In various embodiments, the annular cylindrical structure 402 may have an outer diameter of 0.050 in [1.27 mm] and the counterbore portion 406 may be recessed from the outer diameter by 0.005 in [0.127 mm]. In various embodiments, the annular cylindrical structure 402 may extend 0.080 in [2.032 mm] along the Y-axis.

With additional reference to FIGS. 5A, 5B, 5C and 5D housing 300 of probe 200 is shown in cross section and perspective. Housing 300 comprises a body 500 having a top surface 502 and a barrel portion 504 extending opposite the top surface 502. Barrel portion 504 terminates at optical face 506. Housing 300 includes a first channel 510 which extends from top surface 502 along the Y-axis into body 500 and a second channel 512 within the first channel 510 and extending into body 500 relatively below (along the Y-axis) the first channel 510. The second channel 512 opens through optical face 506 at sensing aperture 508 and comprises a radiused portion 514. Inner hypotube 310 is inserted into the first channel 510 and into the second channel 512 and coupled at sensing aperture. In various embodiments, inner hypotube 310 may be coupled by one of brazing, shrink fitting, or welding. In various embodiments, inner hypotube 310 may extend relatively below (along the Y-axis) the optical face 506 between 0.00 in [0.00 mm] and 0.025 in [0.635 mm], or may extend between 0.010 in [0.254 mm] and 0.020 in [0.508 mm].

In various embodiments, the plurality of optical fibers 412 may be drawn into inner hypotube 310 and counterbore portion 406 of expendable fiber arrangement holder 400 may be inserted along arrow 516 over inner hypotube 310. The expendable fiber arrangement holder 400 may be coupled at counterbore end 408 to sensing aperture 508 and inner hypotube 310 may be filled with epoxy 414. In various embodiments, the epoxy may be partially cured and the inner hypotube 310 may be bent within the housing 300 along the radiused portion 514 as indicated by arrow 518 to match the radius. In various embodiments the bend may be between 45° (e.g., FIG. 5D) and 90° (e.g., FIG. 5C). In various embodiments, the epoxy may be fully cured and the expendable fiber arrangement holder 400 may be polished flush with optical face 506 where flush in this context means between 0.00 in [0.00 mm] and 0.025 in [0.635 mm] of optical face 506.

Figure 5E:
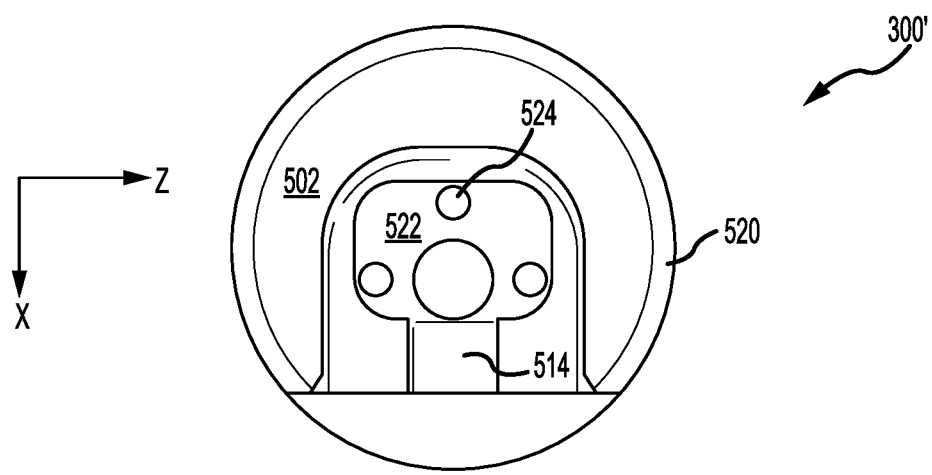
FIG. 5E illustrates a top surface view of a housing for a low profile un-lensed NSMS probe, in accordance with various embodiments.
Figure 5F:
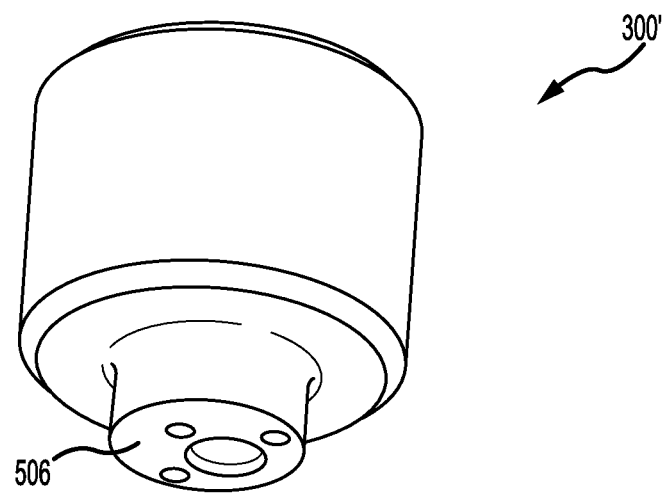
FIG. 5F illustrates a perspective view of a housing for a low profile un-lensed NSMS probe, in accordance with various embodiments.
Figure 5G:
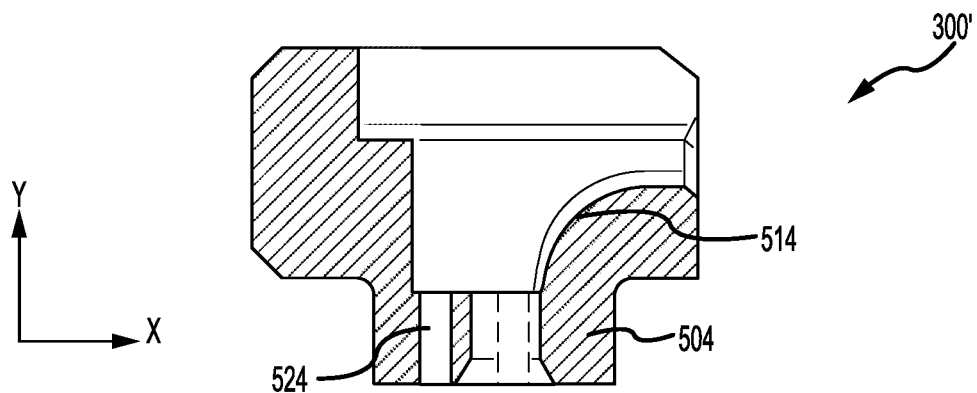
FIG. 5G illustrates a cross section of a housing for a low profile un-lensed NSMS probe, in accordance with various embodiments.

With additional reference to FIGS. 5E, 5F, and 5G a housing 300' for probe 200 is illustrated having features, geometries, construction, materials, manufacturing techniques, and/or internal components similar to housing 300. Housing 300' includes a base portion 522 extending into the second channel 512 below (along the Y-axis) the radiused portion 518. The base portion 522 has one or more of a purge port 524 opening from the second channel 512 through the optical face 506 of the barrel portion 504.

Figure 6A:
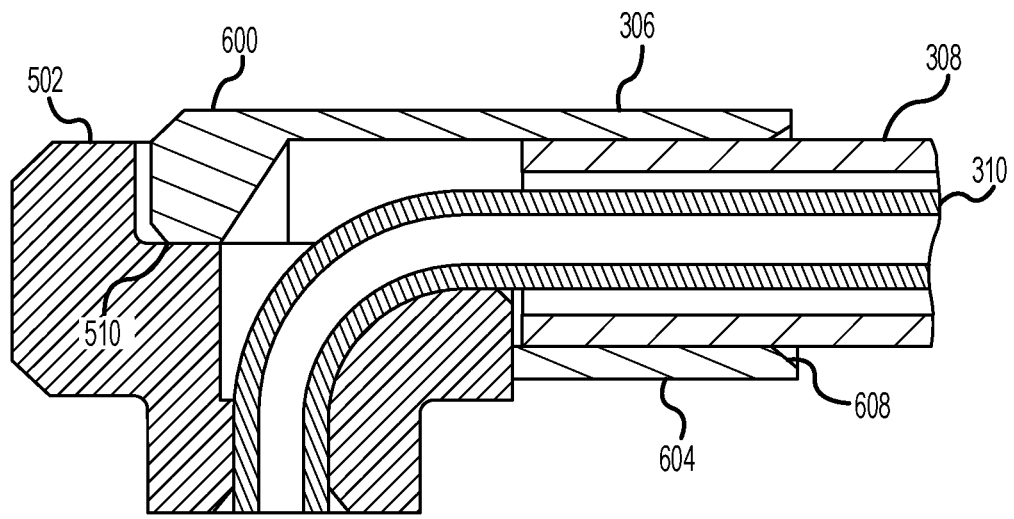
FIG. 6A illustrates a cap for a low profile un-lensed NSMS probe, in accordance with various embodiments.
Figure 6B:
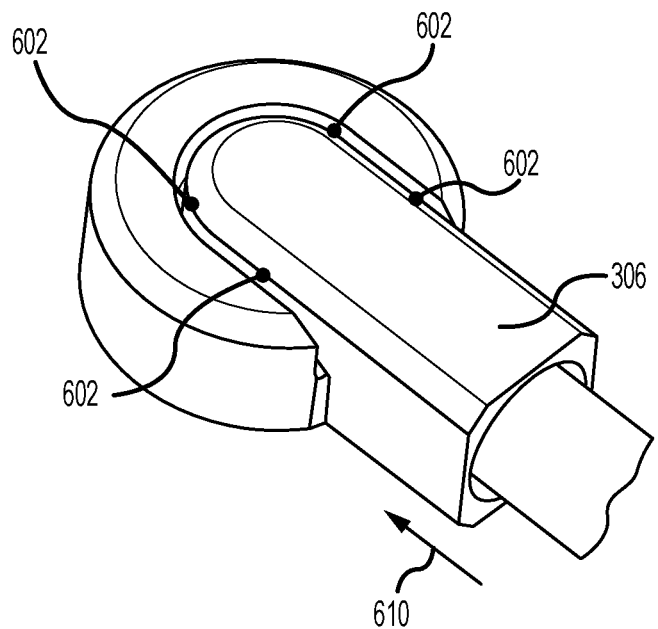
FIG. 6B illustrates a cap for a low profile un-lensed NSMS probe, in accordance with various embodiments.

With additional reference to FIGS. 6A and 6B, cap 306 is shown coupled to housing 300. Cap 306 comprises a hood portion 600 and a sleeve portion 604. Outer hypotube 308 inserted into sleeve portion 604 and coupled to the sleeve portion at chamfer 608. The cap 306 and outer hypotube 308 are slid (along arrow 610) over inner hypotube 310. The hood portion 600 rests in the base of the first channel 510 and covers the first channel 510 and the second channel 512. The hood portion 600 may be coupled to the top surface 502 such as, for example, by a plurality of spot welds 602. In various embodiments, a cooling fluid may flow within the outer hypotube 308 and may be directed by the hood portion 600 into the first channel 510 and/or the second channel 512. In various embodiments, the coolant may exit the housing 300 via the sensing aperture 508 or other exit path through optical face 506 such as, for example, purge port 524.

Figure 7:
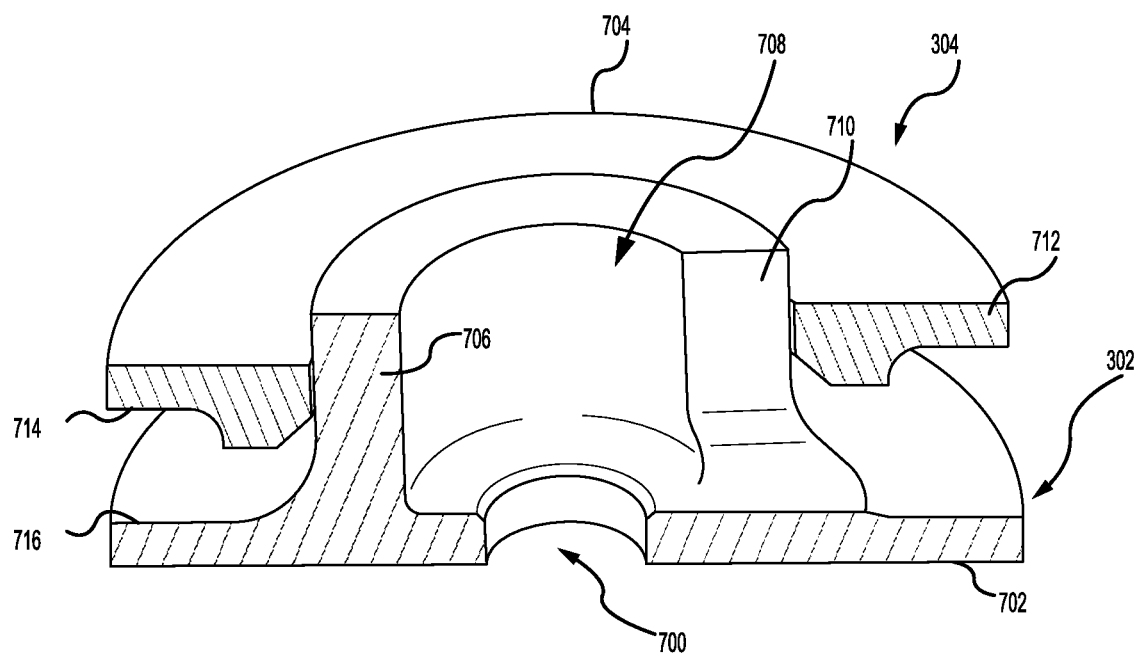
FIG. 7 illustrates a perspective cross section of a collet for a low profile un-lensed NSMS probe, in accordance with various embodiments.

With additional reference to FIG. 7, inner collar 302 and outer collar 304 of probe 200 are shown in perspective cross section. Inner collar 302 comprises a first annular disk 702 having a first annulus 700. Annular wall 706 extends perpendicular to the plane of the first annular disk 702 about the first annulus 700 and defines cavity 708 within. Annular wall 706 includes a first cutout 710 and, in this regard, does not completely encircle first annulus 700. Outer collar 304 comprises a second annular disk 704 having a second annulus defined by the outer diameter of annular wall 706. The second annular disk 704 comprises a second cutout 712 of a width corresponding to the first cutout 710. In this regard, the annular wall 706 and the second annular disk 704 may form a C-shape when viewed in plane.

In various embodiments and with combined reference to FIGS. 2, 5A, and 6, inner collar 302 may be inserted through second bore 212 with annular wall 706 relatively upward (along the Y-axis) and first surface 716 may be contacted with lip 210 and fixed in place with annular wall 706 protruding relatively above lip 210. Outer collar 304 may be disposed about annular wall 706 with second surface 714 contacting lip 210 and the second cutout 712 may be aligned with the first cutout 710. Second annular disk 704 of outer collar 304 may be coupled about the second annulus to the annular wall 706 thereby coupling the inner collar 302 and the outer collar 304 to the case 202. Housing 300 may be disposed within cavity 708 with barrel portion 504 inserted into first annulus 700 and cap 306 lying within the first cutout 710 and the second cutout 712. In various embodiments, the housing 300 may be coupled at top surface 502 to the inner diameter of the annular wall 706 such as, for example, by a plurality of spot welds placed along top surface chamfer 520. In various embodiments, the first bore 208 and the second bore 212 may be filled by an epoxy and cured. In various embodiments, the second bore fill may be molded or match drilled to form an aperture in optical communication with sensing aperture 508 of optical face 506.

Figure 8:
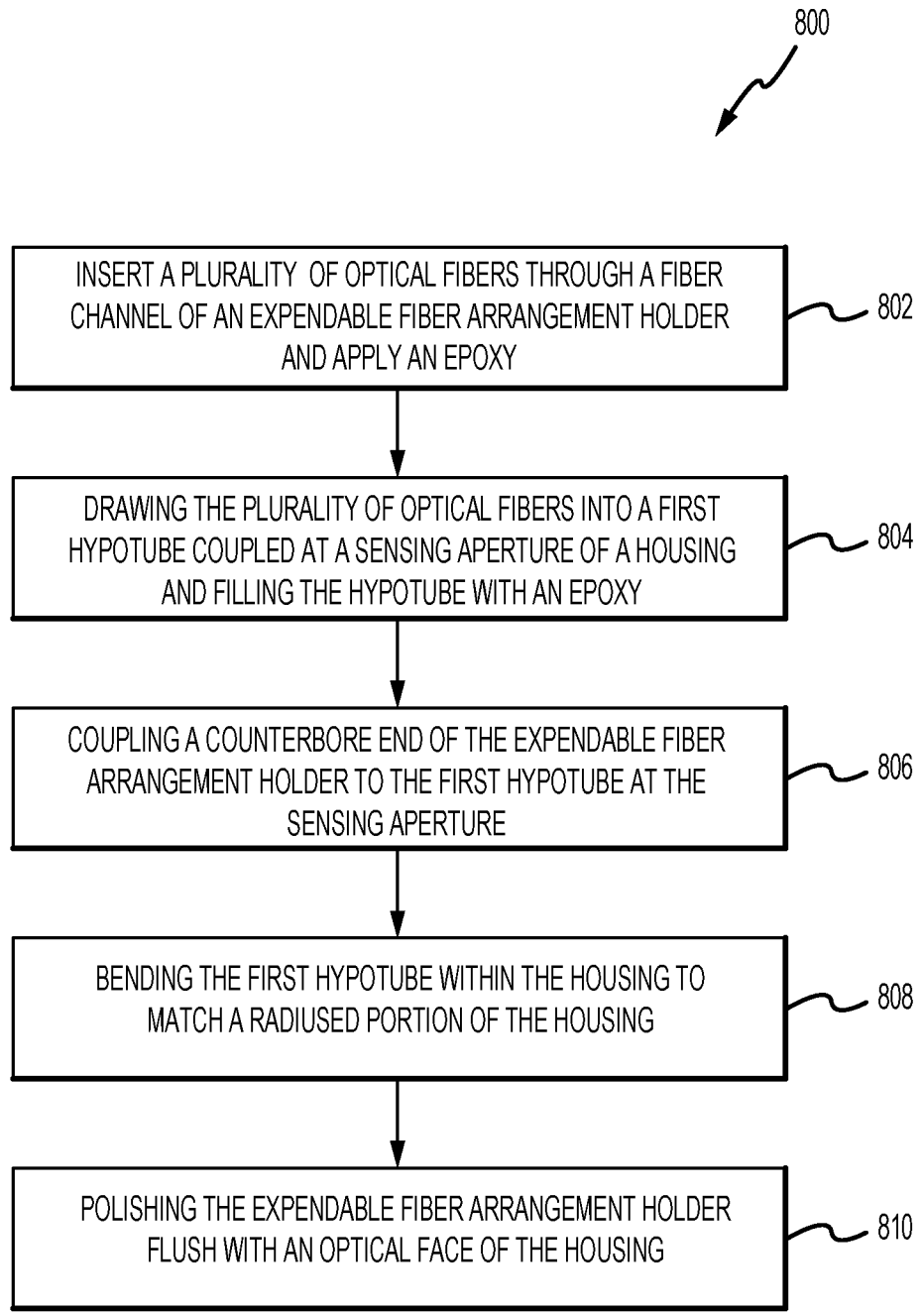
FIG. 8 illustrates a method of manufacturing a low profile un-lensed NSMS probe, in accordance with various embodiments.

With additional reference to FIG. 8, a method 800 of manufacturing a low profile un-lensed non-intrusive stress measurement system probe comprises inserting a plurality of optical fibers through a fiber channel of an expendable fiber arrangement holder and applying an epoxy to the plurality of optical fibers (step 802). Optical fibers 512 may be inserted into fiber channel 404 of expendable fiber arrangement holder 400 and epoxy 414 may be applied. Method 800 includes drawing the plurality of optical fibers into a first hypotube coupled at a sensing aperture of a housing and filling the first hypotube with the epoxy (step 804). Optical fibers 412 may be drawn into inner hypotube 310 and inner hypotube 310 may be filled with epoxy 414. In various embodiments, epoxy 414 may be heated to promote flow of epoxy 414 within inner hypotube 310. Method 800 includes coupling a counterbore end of the expendable fiber arrangement holder to the first hypotube at the sensing aperture (step 806). Counterbore portion 406 at counterbore end 408 may be coupled about a portion of inner hypotube 310 protruding from sensor aperture 508.

Method 800 includes bending the first hypotube within the housing to match a radiused portion of the housing (step 808). Inner hypotube 310 may be bent to match radiused portion 514 of housing 300. Step 808 may include curing the epoxy 414 in response to bending the inner hypotube 310. Method 800 includes polishing the expendable fiber arrangement holder flush with an optical face of the housing (step 810). Step 810 may include verifying the expendable fiber holder 400 is securely coupled to the inner hypotube 310 such as, for example, by conducting a pull test. Expendable fiber arrangement holder 400 may be polished flush with optical face 506 of housing 300 where flush in this context means between 0.00 in [0.00 mm] and 0.025 in [0.635 mm] of optical face 506. In various embodiments, the polishing process includes use of any of a fabricated polishing puck, 600 grit sand paper, 3 um Aluminum Oxide polishing paper, 3/10 um Aluminum Oxide polishing paper, and/or the like. In various embodiments a polishing machine may be used and a polishing head of the polishing machine may be configured between 50 and 100 RPM.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiment Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A stress measurement system probe, comprising:
   a housing comprising a first channel, a second channel, and an optical face;
   a first hypotube disposed in the first channel and extending proximal a sensing aperture defined in the optical face; and
   a plurality of optical fibers disposed within the first hypotube,
   wherein the first hypotube includes a bend within the housing, wherein:
   the first channel extends into the housing from a surface of the housing,
   the second channel is proximal to the first channel and opposite first surface, and
   the second channel includes a radiused portion.

2. The stress measurement system probe of claim 1, wherein the first hypotube is bent along the radiused portion.

3. The stress measurement system probe of claim 1, wherein a cap is coupled to the housing, wherein the cap comprises a hood covering the first channel and a sleeve portion about the first hypotube, wherein a second hypotube is disposed about the first hypotube and inserted into the sleeve portion.

4. The stress measurement system probe of claim 1, wherein the housing is disposed within a cavity defined by an annular wall about a first annulus of a first annular disk, wherein the housing comprises barrel inserted into the first annulus of the first annular disk, wherein a second annular disk comprising a second annulus defined by an outer diameter of the annular wall is coupled at the second annulus to the annular wall.

5. The stress measurement system probe of claim 1, wherein:
   the stress measurement system probe comprises a low profile un-lensed non-intrusive stress measurement system probe, and
   the bend is between 45° and 90°.

6. The stress measurement system probe of claim 1, wherein the plurality of optical fibers comprises at least one of a transmit fiber and a receive fiber.

7. The stress measurement system probe of claim 6, wherein the plurality of optical fibers are arranged in an expendable fiber arrangement holder, wherein the expendable fiber arrangement holder is coupled at the sensing aperture.

8. The stress measurement system probe of claim 1, wherein the first hypotube is filled with an epoxy.

9. The stress measurement system probe of claim 8, wherein:
   the plurality of optical fibers are arranged in an expendable fiber arrangement holder, and
   the epoxy is cured and the expendable fiber arrangement holder is polished flush with the optical face.

10. A gas turbine engine comprising:
    a fan section;
    a compressor section aft of the fan section and configured to compress a gas;
    a combustor section aft of the compressor section and configured to combust the gas;
    a turbine section aft of the combustor section and configured to extract work from the gas;
    a case about at least one of the fan section, the compressor section, the combustor section, or the turbine section; and
    a stress measurement system probe coupled to the case, comprising:
    a housing comprising a first channel and an optical face;
    a first hypotube disposed in the first channel and extending proximal a sensing aperture defined in the optical face; and
    a plurality of optical fibers disposed within the first hypotube,
    wherein the first hypotube executes a bend within the housing, wherein:
    the first channel extends into the housing from a surface of the housing, a second channel is adjacent to the first channel and opposite the surface, and the second channel includes a radiused portion.

11. The gas turbine engine of claim 10, wherein the first hypotube is bent along the radiused portion.

12. The gas turbine engine of claim 10, wherein a cap is coupled to the housing, wherein the cap comprises a hood covering the first channel and a sleeve portion about the first hypotube, wherein a second hypotube is disposed about the first hypotube and inserted into the sleeve portion.

13. The gas turbine engine of claim 10, wherein:

the stress measurement system probe comprises a low profile un-lensed non-intrusive stress measurement system probe, and the bend is between 45° and 90°.

14. The gas turbine engine of claim 10, wherein the plurality of optical fibers comprises at least one of a transmit fiber and a receive fiber.

15. The gas turbine engine of claim 14, wherein the plurality of optical fibers are arranged in an expendable fiber arrangement holder, wherein the expendable fiber arrangement holder is coupled at the sensing aperture.

16. The gas turbine engine of claim 10, wherein the first hypotube is filled with an epoxy.

17. The gas turbine engine of claim 16, wherein:

the plurality of optical fibers are arranged in an expendable fiber arrangement holder, and the epoxy is cured and the expendable fiber arrangement holder is polished flush with the optical face in response to bending the first hypotube along the radiused portion.

18. The gas turbine engine of claim 10, wherein the housing is disposed within a cavity defined by an annular wall about a first annulus of a first annular disk, wherein the housing comprises barrel inserted into the first annulus of the first annular disk, wherein a second annular disk comprising a second annulus defined by an outer diameter of the annular wall is coupled at the second annulus to the annular wall.

19. The gas turbine engine of claim 18, wherein the case comprises a first bore having a lip forming an annular structure within the first bore, wherein the first annular disk has a first surface in contact with the lip and the second annular disk has a second surface in contact with the lip.

20. A method of manufacturing a stress measurement system probe, the method comprising:

inserting a plurality of optical fibers through a fiber channel of an expendable fiber arrangement holder and applying an epoxy to the plurality of optical fibers;

drawing the plurality of optical fibers into a first hypotube coupled at a sensing aperture of a housing and filling the first hypotube with the epoxy;

coupling a counterbore end of the expendable fiber arrangement holder to the first hypotube at the sensing aperture by one of brazing, shrink fitting, or welding;

bending the first hypotube within the housing to match a radiused portion of the housing; and polishing the expendable fiber arrangement holder flush with an optical face of the housing.

* * * * *